Patented Aug. 1, 1950

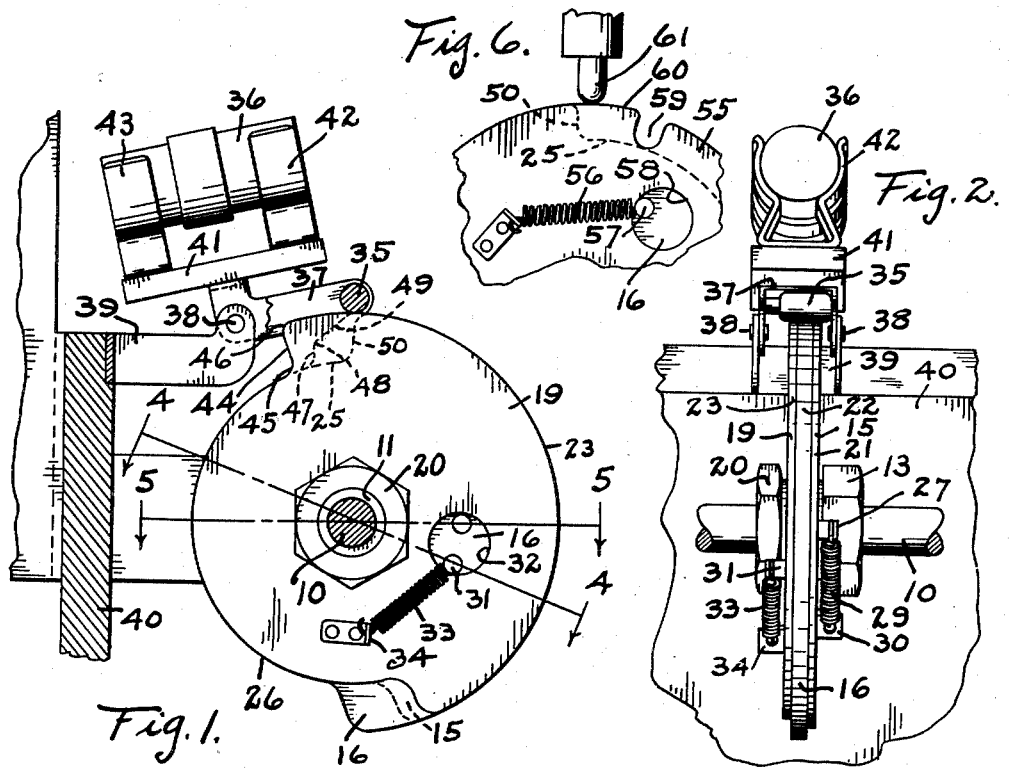
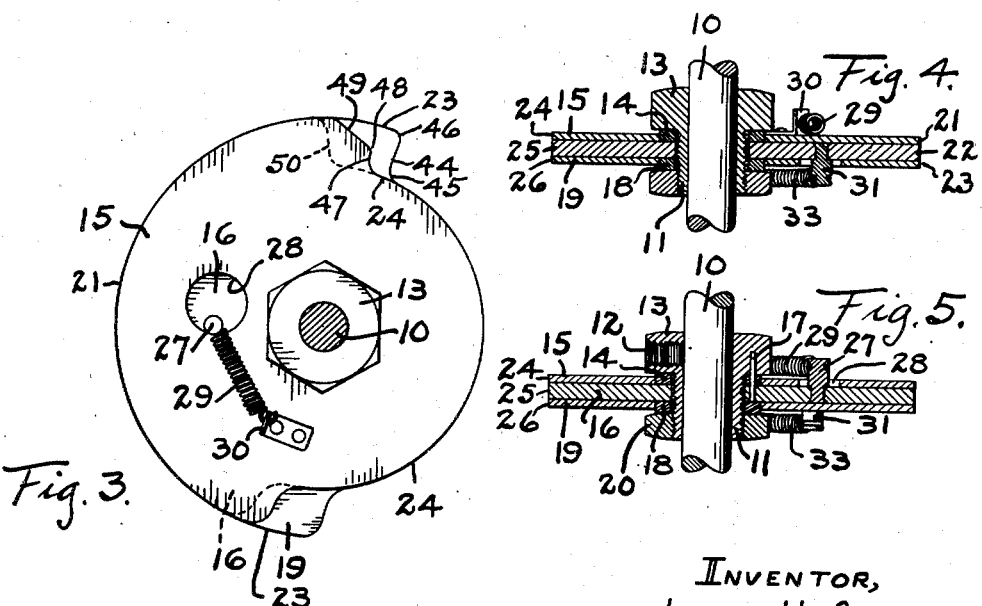

2,517,142

UNITED STATES PATENT OFFICE 2,517,142

VARIABLE CONTOUR CAM

Joseph H. Staley, Columbus, Ind.

Application April 22, 1948, Serial No. 22,592

3 Claims. (Cl. 74—567)

This invention relates to a cam having an automatically variable contour which may be shortened and lengthened in regard to the direction of rotation of the cam. A primary purpose of the invention is to provide a cam structure whereby a cam follower may be quickly elevated relatively from a lower surface to a higher surface with what may be termed a snap action. A further primary advantage of the invention is that the cam will give a longer surface on which the follower may dwell in one direction of rotation of the cam as compared to an opposite direction of rotation of the cam.

The invention is particularly useful in electrically timing the stopping and starting and also sequence of operations in many fields.

These and many other objects and advantages of the invention will become apparent to those versed in the art in the following description of one particular form of the invention as illustrated in the accompanying drawing, in which Fig. 1 is a view in side elevation of a cam structure embodying the invention and mounted on a shaft;

Fig. 2, a view in front elevation;

Fig. 3, a view in side elevation opposite to that shown in Fig. 1;

Fig. 4, a view in section on the line 4—4 of Fig. 1;

Fig. 5, a view in section on the line 5—5 in Fig. 1; and

Fig. 6, a side elevation of a fragment of a modified form of the structure.

Referring to the drawing, in which like characters of reference indicate like parts throughout the several views, I provide a driving shaft 10, on which is mounted a sleeve 11 in a fixed manner such as by a set screw 12, Fig. 5, which screw passes through a head 13 on the sleeve 11 and bears against the shaft 10. On the sleeve 11 is placed a short bushing 14 to bear against the inside face of the head 13.

A cam member 15 is provided with a central bore to permit the cam 15 to be inserted over the sleeve 11 and have a running fit around the outside of the bushing 14. A second cam member 16 is fitted over the sleeve 11 to have its central portion bear against the bushing 14 to retain it against the head 13. This cam member 16 is held in position in a fixed manner relative to the sleeve 11 by any suitable means, herein shown as by a pin 17 inserted through the cam 16, the bushing 14, and terminating within the head 13, Fig. 5.

A bushing 18 is fitted over the sleeve 11 to bear against the face of the cam 16 and to receive therearound a third cam member 19. The cam member 19 may freely rotate around the bushing 18. A nut 20 screw-threadedly engages the outer end of the sleeve 11 and is drawn therealong to compress the bushing 18 against the cam member 16 and in turn compress the bushing 14 against the head 13. Thus it is to be seen that the cam members 15 and 19 are shiftable while the central cam member 16 is fixed all in relation to the sleeve 11, and consequently the shaft 10.

Each of these cam members 15, 16, and 19 has a circumferential edge portion 21, 22, and 23 respectively, Figs. 4 and 5, having a common radius of curvature from the center of the shaft 10. This portion of each of the cam members having this common radius may extend the desired circumferential distance therearound depending upon the operations required, herein shown as approximately 180 degrees. This dimension of course may vary, and also the contour of this length may also vary, although it is shown herein for the sake of illustration as having a constant radius. Then these same cam members 15, 16, and 19 have another circumferential length 24, 25, and 26 respectively, of a common radius from the center of shaft 10, this radius being less than the radius of the other portions just described of each of the cam members.

The cam member 16 has a post 27 fixed thereto to extend laterally therefrom through a window 28 provided in the cam member 15. Thus the cam member 15 may revolve around the bushing 14 a limited distance as is determined by the post 27 striking opposite sides of the window 28. In order to maintain the cam member 15 in an initial position relative to the central cam member 16, there is a spring 29 secured to the outer end of the post 27 and extending along the outer face of the cam member 15 to have the other end of the spring 29 secured to a lug 30 that is attached to the outer face of the cam member 15. The spring 29 is stretched slightly when the post 27 is in the position as indicated in Fig. 3. In other words, normally the cam member 15 is relatively pulled by the spring 29 around until the edge position of the window 28 strikes against the post 27.

Now in the same manner, there is a post 31 anchored in the central cam member 16 to extend laterally therefrom, in a direction opposite from that of the post 27. In other words the post 31 extends from the opposite face of the cam number 16. In so doing, it extends through a window 32 which is provided in the cam member 19. A tension spring 33 is secured to the outer end of the post 31 and extends along the outer side face of the cam member 19 to have the other end of the spring 33 secured to a lug 34 attached to the outer face of the cam member 19, Fig. 1. In this manner, the cam member 19 is relatively rotated or revolved around the bushing 18 to have the edge portion of the window 32 strike against the post 31.

While the cam construction so far described may be employed to operate different mechanisms, it is herein illustrated in conjunction with a cam follower 35 in a nature of a roller which is used to operate a mercury tube switch 36. In the form herein shown, and not forming part of the invention per se, the cam follower roller 35 is carried by an arm 37 which in turn is pivoted on the pins 38 carried by a bracket 39, in turn fixed to a panel 40. The arm 37 which in the present showing is bifurcated extends upwardly from the pivot pins 38 to carry thereon a switch base 41 in turn carrying the two clips 42 and 43 between which the mercury tube switch 36 is removably engaged.

Attention is to be focused upon the peripheral portions of the three cam members 15, 16, and 19 which lie between the two circumferential major surfaces of the smaller and larger radii.

The contour of the cam member 19 has a radial portion 44 which extends from a fillet 45 radially from the edge portion 26 outwardly and around through a portion of a short radius 46 to join into the edge portion 23. The contour of the cam member 15 has a short length of a substantially radial portion 47 extending upwardly from a radius at its juncture with edge portion 24 outwardly to a distance slightly greater at least than the radius of the roller 35. In other words this length 47 terminates at a transverse line 48, and from that point 48, the surface of the cam 15 slopes in a substantially straight line to the right, Fig. 1, at an angle to the line 47 of approximately 45 degrees to terminate in the outer or major edge portion 21. The sloping part of the cam is designated by the numeral 49. Then the central cam member 16, is provided with an outwardly extending portion 50 inclined somewhat from the radial line, the line 50 leaning somewhat to the right as viewed in Fig. 1 from the surface 25 to the outer surface 22.

Now these various intervening cam surface portions between the relatively lower and higher surfaces of the cam as assembled will normally be positioned as indicated by the lines in Fig. 1. Assuming that the entire cam assembly is to be revolved in a counterclockwise direction as viewed in Fig. 1, the portion 44 will be foremost in that line of direction of travel. Then spaced around in a clockwise direction will come the portion 47, and then spaced on further around in a clockwise direction is the portion 50. These are the positions of the sections 15 and 19 relative to 16 which are yieldingly maintained by the springs 29 and 33 in the manner above described.

Now assuming further that the cam assembly is to be revolved initially in a counterclockwise direction, and that the cam follower 35 is resting upon the lower surfaces 24, 25, and 26, then the portion 44 of the cam 19 will strike the roller 35. The cam member 19 by reason of its radial line 44 will be stopped, and held against the roller 35 while the cam member 15 will bring its portion 47 around against the roller 35 and since that portion is also substantially radial, it will also effectively stop rotation of the cam member 15. In the meantime the cam member 16, the central member, will come on around until it strikes the roller 35. By reason of its inclined surface 50, the roller 35 will tend to be lifted to travel upwardly therealong.

However as soon as the roller 35 is lifted by the surface 50 that distance which will permit the roller 35 to come up to the point 48, and tend to roll on the surface 49, the spring 29 will snap the cam member 15 on around counterclockwise so as to quickly elevate the roller 35 up to the common surfaces 21, 22 and 23. Immediately the roller 35 reaches that elevation, then the cam members 19 and 15, will be returned to their initial and normal positions as indicated in Fig. 1, whereupon they effectively extend the length of those surfaces 21, 22, and 23 when the cam assembly is reversely revolved, such as in a clockwise direction, in reference to the intersection of the line 50 and the surface 25. In other words, when the cam assembly is revolved clockwise, the roller 35 is held in the elevated position until it drops down over the radius 46 and down the radial surface 44 onto the surface 26.

One of the important advantages in this construction, particularly where the cam is used to operate a switch such as a mercury switch 36, in the absence of the cam member 15, the roller 35 would tend to travel relatively slowly up the surface 50, and before the roller 35 reached the maximum elevation of the surface 23, the switch 36 would be operated, and if that switch 36 happened to be controlling the drive of the shaft 10, then of course the entire assembly would come to rest without any further travel of the shaft 10.

Referring to the modified form of the structure shown in Fig. 6, cam 16 is employed as the fixed, driven member as in the other forms. However, a shiftable cam member 55 is employed to be normally positioned by the spring 56 against the post 57 which is fixed to the member 16 and which extends through the window 58 in the member 55.

This member 55 has a notch 59 entering from its periphery 60 which is of the same radius of curvature as that of the cam member 16 surface 22. A plunger type follower pin 61 rides on the combined surfaces 22 and 60. Assuming a clockwise direction of cam travel, the pin 61 will drop into the notch 59 to produce the required travel thereof effective for the control desired, such as the operation of a switch or any mechanical device, not shown, but within the knowledge of those versed in the art.

Upon dropping into the notch 59, the cam member 55 will then be yieldingly carried along until the cam 16 stops traveling, and then upon withdrawal of the pin 61 (such as by a solenoid magnet, not shown), the cam member 55 will be snapped back by the spring 56, thereby presenting the surface 60 as a continuation of the combined surfaces 22 and 60, and against which surface 60 the pin 61 may return. The important feature in this modified form is, the automatically returning cam member to its normal position after having been yieldingly shifted therefrom, and to present a continuation of the "outer" cam surface under the follower.

While I have herein shown and described my invention in the two particular forms, it is obvious that structural changes may be employed without departing from the spirit of the invention, and I therefore do not desire to be limited to those precise forms beyond the limitations which may be imposed by the following claims.

I claim:

1. A cam structure having a cam follower comprising a relatively fixed cam member having a contour with relatively high and low surfaces a second cam member having a high surface laterally complementing in part at least said fixed cam high surface, and having a lower surface, all in the path of said follower; means yieldingly retaining said second cam in a predetermined position relative to said fixed cam member; said second cam member having a follower abutment between its said two surfaces; said position being that wherein said abutment is spaced from the zone between the two said surfaces of said fixed cam member in the direction of said fixed cam low surface extending therefrom; and a third cam member yieldingly retained in a predetermined position relative to both of said fixed and second cams; said third cam having a follower abutment in said predetermined position located between said zone and said second cam abutment; said third cam positioning means comprising a spring interconnecting it with said fixed cam, whereby said follower upon striking said second and third cam abutment may carry those abutments relatively into said fixed cam zone upon one direction of relative travel of said fixed cam zone and said follower toward each other; said zone having an inclined surface from the fixed cam low to high surfaces shaped to lift said follower thereover; and said third cam having a peripheral slope from its abutment to its high surface permitting said third cam spring to snap said third cam back under said follower in said travel.

2. A cam and cam follower structure comprising a driving member; a drive cam fixed to said member, said cam having a major radius surface and a minor radius surface and a non-radial surface therebetween sloping rearwardly in respect to direction of rotation of the cam; a second cam revolubly carried by said member adjacent said drive cam, having a major radius surface and a minor radius surface and a substantially radially disposed surface therebetween; spring means normally advancing in direction of the drive cam rotation said radially disposed surface ahead of said drive cam non-radial surface; abutment means between the drive cam and said second cam limiting the degree of said advancement; a third cam revolubly carried by said drive member adjacent said drive cam and having a major radius surface and a minor radius surface and further having a short radial surface extending outward from the minor radius surface sufficient to form an abutment for said cam follower, and a non-radial surface continuing from said short radial surface rearwardly to said major radius surface; spring means for advancing said third cam to have its said short radial surface ahead of said radial surface of said drive cam; and abutment means between said drive cam and said third cam limiting the degree of advancement of the third cam.

3. A cam and cam follower structure comprising a driving member; a drive cam fixed to said member, said cam having a major radius surface and a minor radius surface and a non-radial surface therebetween sloping rearwardly in respect to direction of rotation of the cam; a second cam revolubly carried by said member adjacent said drive cam, having a major radius surface and a minor radius surface and a substantially radially disposed surface therebetween; spring means normally advancing in direction of the drive cam rotation said radially disposed surface ahead of said drive cam non-radial surface; abutment means between the drive cam and said second cam limiting the degree of said advancement; a third cam revolubly carried by said drive member adjacent said drive cam and having a major radius surface and a minor radius surface and further having a short radial surface extending outward from the minor radius surface sufficient to form an abutment for said cam follower, and a non-radial surface continuing from said short radial surface rearwardly to said major radius surface; spring means for advancing said third cam to have its said short radial surface ahead of said radial surface of said drive cam; and abutment means between said drive cam and said third cam limiting the degree of advancement of the third cam; to position said short radial surface intermediate the positions of said drive cam non-radial surface and of said second cam radial surface.

JOSEPH H. STALEY.

REFERENCES CITED

The following references are of record in the file of this patent:

UNITED STATES PATENTS

| Number | Name | Date |
| --- | --- | --- |
| 521,257 | Brown | June 12, 1894 |
| 1,290,201 | Homans | Jan. 7, 1919 |
| 1,831,605 | Porter | Nov. 10, 1931 |
| 2,086,090 | Streckfuss | Sept. 29, 1942 |
| 2,297,090 | Weaver | Sept. 29, 1942 |